US009108521B2

(12) United States Patent
Jung et al.

(10) Patent No.: US 9,108,521 B2
(45) Date of Patent: *Aug. 18, 2015

(54) BATTERY CONTROL APPARATUS AND METHOD

(71) Applicant: LG CHEM, LTD., Seoul (KR)

(72) Inventors: Chang-Gi Jung, Daejeon (KR); Hyung-Ju Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 106 days.

This patent is subject to a terminal disclaimer.

(21) Appl. No.: 14/017,438

(22) Filed: Sep. 4, 2013

(65) Prior Publication Data

US 2014/0002026 A1 Jan. 2, 2014

Related U.S. Application Data

(63) Continuation of application No. 13/541,114, filed on Jul. 3, 2012, now Pat. No. 8,552,686, which is a continuation of application No. PCT/KR2011/000091, filed on Jan. 6, 2011.

(30) Foreign Application Priority Data

Jan. 6, 2010 (KR) .................. 10-2010-0000928
Jan. 6, 2011 (KR) .................. 10-2011-0001467

(51) Int. Cl.
 *H02J 7/02* (2006.01)
 *B60L 11/18* (2006.01)
 (Continued)

(52) U.S. Cl.
 CPC ......... *B60L 11/1809* (2013.01); *B60L 11/1868* (2013.01); *B60R 16/03* (2013.01);
 (Continued)

(58) Field of Classification Search
 USPC ........................................................ 320/109
 See application file for complete search history.

(56) References Cited

U.S. PATENT DOCUMENTS 5,549,172 A * 8/1996 Mutoh et al. .................. 180/65.1
5,739,668 A * 4/1998 Nishikiori ..................... 320/111
(Continued)

FOREIGN PATENT DOCUMENTS

EP 2104199 A1 9/2009
JP 11-196539 A 7/1999
(Continued)

OTHER PUBLICATIONS

International Search Report for PCT/KR2011/000091 dated Sep. 15, 2011.

*Primary Examiner* — Yalkew Fantu
(74) *Attorney, Agent, or Firm* — Birch, Stewart, Kolasch & Birch, LLP (57) ABSTRACT

A battery control apparatus includes an emergency charging unit including an external charging terminal for applying power to a main battery pack, a first voltage measurement unit for measuring the voltage of the external charging terminal, and an emergency charging switch for switching the connection between the external charging terminal and the main battery pack; an auxiliary battery connection unit including an auxiliary battery connection terminal for applying power to the vehicle through a contactor, a second voltage measurement unit for measuring the voltage of the auxiliary battery connection terminal, and an auxiliary battery switch for switching the connection between the auxiliary battery connection terminal and the contactor; and an emergency control unit for switching to an emergency charging mode or an auxiliary connection mode by turning on the emergency charging switch or the auxiliary battery switch during the voltage measurement of the first or second voltage measurement unit.

19 Claims, 4 Drawing Sheets (51) Int. Cl.
*H01M 10/44* (2006.01)
*H01M 10/48* (2006.01)
*H02J 7/00* (2006.01)
*B60R 16/03* (2006.01)
*B60K 1/00* (2006.01)

(52) U.S. Cl.
CPC ............ *H01M 10/44* (2013.01); *H01M 10/48* (2013.01); *H02J 7/0055* (2013.01); *Y02T 10/7005* (2013.01); *Y02T 10/7066* (2013.01)

(56) References Cited

U.S. PATENT DOCUMENTS

| | | | |
|---|---|---|---|
| 5,931,245 A | 8/1999 | Uetake et al. | |
| 6,037,747 A | 3/2000 | Chalasani et al. | |
| 6,114,775 A * | 9/2000 | Chung et al. | 307/10.1 |
| 6,166,517 A * | 12/2000 | Wakashiro et al. | 320/104 |
| 6,225,784 B1 * | 5/2001 | Kinoshita et al. | 320/132 |
| 2007/0024219 A1 * | 2/2007 | Aoyagi et al. | 318/139 |
| 2007/0190369 A1 * | 8/2007 | Leach et al. | 429/9 |
| 2009/0024267 A1 * | 1/2009 | Kawai | 701/22 |
| 2010/0228413 A1 * | 9/2010 | Fujitake | 701/22 |
| 2011/0187184 A1 | 8/2011 | Ichikawa | |

FOREIGN PATENT DOCUMENTS

| | | |
|---|---|---|
| JP | 11-289679 A | 10/1999 |
| JP | 2004-134145 A | 4/2004 |
| JP | 2007-6567 A | 1/2007 |
| JP | 2007-037275 A | 2/2007 |
| JP | 2007-82385 A | 3/2007 |
| JP | 2009-247057 A | 10/2009 |
| KR | 10-1997-0036332 A | 7/1997 |
| KR | 10-1999-0033900 A | 5/1999 |
| KR | 10-0258043 B1 | 6/2000 |
| KR | 10-2005-0048038 A | 5/2005 |
| WO | WO 2009/116311 A1 | 9/2009 |

* cited by examiner

BATTERY CONTROL APPARATUS AND METHOD

CROSS-REFERENCE TO RELATED APPLICATION

This application is a Continuation of U.S. application Ser. No. 13/541,114, filed on Jul. 3, 2012, which is a Continuation of International Application No. PCT/KR2011/000091 filed on Jan. 6, 2011, which claims priority under 35 USC 119(a) to Korean Patent Application No. 10-2010-0000928 filed in the Republic of Korea on Jan. 6, 2010 and Korean Patent Application No. 10-2011-0001467 filed in the Republic of Korea on Jan. 6, 2011, the entire contents of which are incorporated herein by reference.

TECHNICAL FIELD

The present disclosure relates to a technique for controlling a battery pack, and more particularly, to a method and apparatus for controlling a vehicle battery pack connected to an external power supply unit in an emergency when the battery pack is fully discharged.

BACKGROUND ART

Recently, as the demand for portable electronic products such as notebooks, video cameras, mobile phones, etc. are rapidly increasing, so are the development of energy storage batteries, robots, satellites, etc., which is leading to the extensive research on high-performance secondary batteries capable of repeated charge and discharge.

Commercially available secondary batteries at present include nickel-cadmium batteries, nickel-hydrogen batteries, nickel-zinc batteries, lithium secondary batteries, etc. Among them, the lithium secondary batteries are less susceptible to memory effect compared to nickel-based secondary batteries and thus can be freely charged and discharged. Moreover, the lithium secondary batteries are attracting much attention for its very low self-discharge rate and high energy density.

In particular, with the recent increase in the interest in the environment where carbon energy is being depleted, environmentally-friendly vehicles such as hybrid vehicles, electric vehicles, etc. have attracted much attention all over the world, including USA, Europe, Japan, and Korea. In such a hybrid vehicle or electric vehicle, the most critical component is a battery, for it provides a driving force to a vehicle motor. The hybrid vehicle or electric vehicle are powered by the charge and discharge of the battery, and thus have high fuel efficiency and do not emit pollutants compared to conventional vehicles powered by internal combustion engines. As a result, the number of users of such vehicles is significantly increasing.

In the case of the battery that is used in such a hybrid vehicle or electric vehicle, the battery's state-of-charge (SOC) may be reduced to the lower limit during operation of the vehicle, by the natural consumption of the battery, or by a power leakage from the vehicle during stopping of the vehicle. The battery's state-of-charge reduced to the lower limit refers to a fully discharged state. At this time, no power is supplied from the battery, and thus the operation of the electric vehicle or devices powered by the battery is severely limited.

Under normal circumstances, when the battery is fully discharged or approaches the fully discharged state, the battery is charged in a battery charging station or by using a battery charger. However, when the vehicle battery is in the fully discharged state in a situation where the vehicle is not located in the battery charging station, the vehicle will not operate, making it necessary to provide emergency charging to the battery. In such a situation, the emergency charging may be provided by an emergency vehicle or another vehicle, otherwise, an emergency battery may be used instead of the fully discharged battery to move to the station.

As such, a vehicle battery provided with an auxiliary charging terminal to have an emergency charging function, a vehicle battery provided with a space for mounting an auxiliary battery, etc. have been developed to prepare for emergencies. Furthermore, a battery with both the emergency charging function and the auxiliary battery mounting function can be a very useful unit for responding to emergencies.

However, in the case of the battery with both the emergency charging function and the auxiliary battery mounting function, there is a lack of research on how to control the battery for each situation. Moreover, vehicle batteries of recent years are provided with a complex control system and various safety units. Therefore, when the emergency charging function and the auxiliary battery mounting function are simply added to the battery, a battery control apparatus cannot effectively control the battery, and thus the battery itself may have serious safety problems.

DISCLOSURE

Technical Problem

The present disclosure is designed to solve the problems of the prior art, and therefore it is an object of the present disclosure to provide a battery control apparatus which can automatically detect the use of an emergency charging function and an auxiliary battery mounting function provided in a battery pack in the event of an emergency, thereby controlling the battery pack based on the corresponding function.

Other objects and advantages of the present disclosure will be understood by the following description and become more apparent from the embodiments of the present disclosure, which are set forth herein. It will be also apparent that objects and advantages of the present disclosure can be embodied easily by the components defined in claims and combinations thereof.

Technical Solution

In order to accomplish the above object, there is provided a battery control apparatus provided in a vehicle battery pack, for controlling the battery pack, which can be charged in an emergency and equipped with an auxiliary battery, the battery control apparatus including: an emergency charging unit including an external charging terminal for applying power to a main battery pack, a first voltage measurement unit for measuring the voltage of the external charging terminal, and an emergency charging switch for switching the connection between the external charging terminal and the main battery pack; an auxiliary battery connection unit including an auxiliary battery connection terminal for applying power to the vehicle through a contactor, a second voltage measurement unit for measuring the voltage of the auxiliary battery connection terminal, and an auxiliary battery switch for switching the connection between the auxiliary battery connection terminal and the contactor; and an emergency control unit for switching to an emergency charging mode by turning on the emergency charging switch during the voltage measurement of the first voltage measurement unit and switching to an auxiliary connection mode by turning on the auxiliary battery switch during the voltage measurement of the second voltage measurement unit.

In addition, in another aspect, a battery management system according to the present disclosure includes the above battery control apparatus.

In addition, in another aspect, a vehicle according to the present disclosure includes the above battery control apparatus.

In addition, in another aspect, there is also provided a vehicle battery pack with a control function, which can be charged in an emergency and equipped with an auxiliary battery, the battery pack including: a main battery pack including at least one battery cell; a battery management system for measuring a cell voltage of the main battery pack and controlling the main battery pack; a charge/discharge control switch for switching charge/discharge power of the main battery pack under the control of the battery management system; an emergency charging module provided with an external charging terminal connected to the main battery pack and applying charging power directly to the main battery pack; an auxiliary battery connection module provided with an auxiliary battery connection terminal connected to a contactor of a main power line and applying power directly to the vehicle; and an emergency control module for switching to an emergency charging mode when a voltage is detected from the external charging terminal of the emergency charging module and switching to an auxiliary connection mode when a voltage is detected from the auxiliary battery connection terminal of the auxiliary battery connection module.

In addition, in another aspect of the present invention, there is also provided a battery control method for controlling a battery in an emergency and implemented in a battery control apparatus provided in a vehicle battery pack, which can be charged in an emergency and equipped with an auxiliary battery, the battery control method including: (a) determining whether a voltage is applied to an external charging terminal connected to a main battery pack and applying charging power to the main battery pack and an auxiliary battery connection terminal connected to a contactor and applying power to the vehicle; (b) switching to an emergency charging mode, when the voltage is applied to the external charging terminal, and charging the main battery pack with the power supplied through the external charging terminal; and (c) switching to an auxiliary battery connection mode, when the voltage is applied to the auxiliary battery connection terminal, and supplying power from the connected auxiliary battery to the vehicle through the main power line.

Advantageous Effects

According to the present disclosure, during emergency charging of the vehicle battery pack or during mounting of the auxiliary battery, the emergency control system of the battery pack automatically detects the situation such that, during the emergency charging, the main power of the battery is cut off and the battery is charged and, during the mounting of the auxiliary battery, the charging line to the battery is cut off and the power of the auxiliary battery is supplied only to the vehicle, thereby safely controlling the battery pack when various attempts are made to handle emergencies.

Accordingly, even when various attempts are made to handle emergencies, no strain is placed on the battery itself, which reduces the occurrence of failures, thereby preventing malfunctions in the battery.

DESCRIPTION OF DRAWINGS

Other objects and aspects of the present disclosure will become apparent from the following descriptions of the embodiments with reference to the accompanying drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
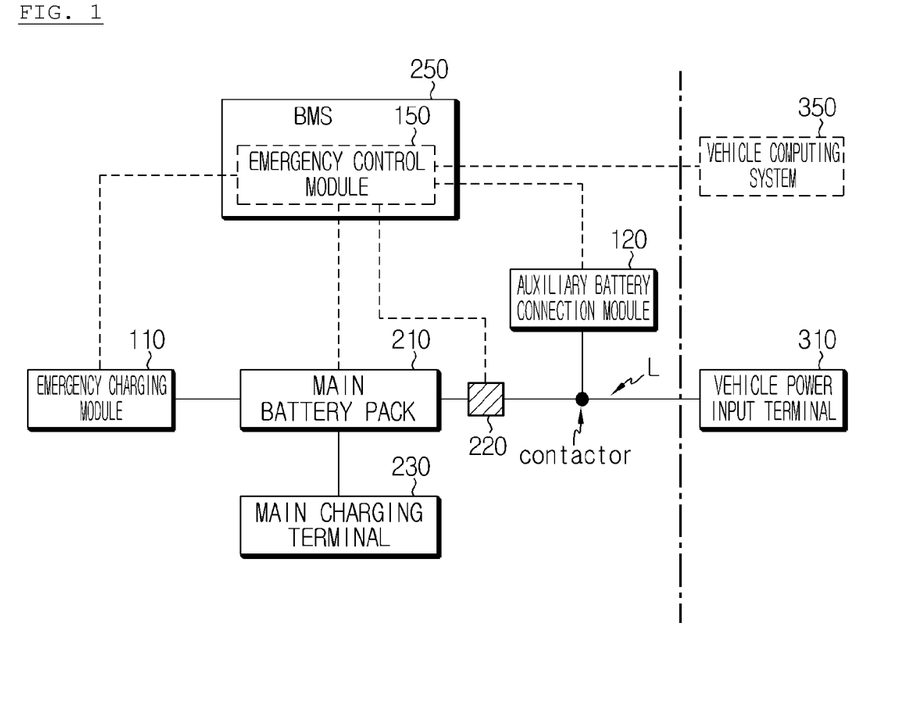
FIG. 1 is a diagram showing the main configuration of a battery pack with a control function in accordance with a preferred embodiment of the present disclosure.

FIG. 1 is a diagram showing the main configuration of a battery pack with a control function in accordance with a preferred embodiment of the present disclosure.

Referring to FIG. 1, a battery pack with a control function in accordance with a preferred embodiment of the present disclosure comprises a main battery pack 210, a charge/discharge control switch 220, a main charging terminal 230, a battery management system (BMS) 250, a pack housing (not shown), an emergency charging module 110, an auxiliary battery connection module 120, and an emergency control module 150.

The main battery pack 210 has a structure in which a plurality of battery cells are connected together and each battery cell serves to charge and discharge electric energy. The battery cells of the main battery pack 210 are connected together in series to meet the voltage capacity required for an electric device powered by the battery pack. Moreover, the main battery pack 210 is connected to a vehicle power input terminal 310 of a vehicle to supply the charged power to the vehicle. Furthermore, the main battery pack 210 is equipped with a unit for measuring voltage, temperature, and other status information, and the measured information is transmitted to the battery management system 250, which will be described later.

The charge/discharge control switch 220 serves to prevent overcharge and overdischarge of the main battery pack 210.

The charge/discharge control switch 220 is turned on and off by the control of the battery management system 250, which will be described later, and includes a C_FET transistor for preventing overcharge and a D_FET transistor for preventing overdischarge. Moreover, the charge/discharge control switch 220 is provided on a main power supply line L between the main battery pack 210 and the vehicle power input terminal 310.

The main charging terminal 230 is a power input terminal for applying charging power to the main battery pack 210 under the control of the battery management system 250, which will be described later.

The battery management system 250 serves to measure the status of the battery cells in the main battery pack 210, such as voltage, temperature, etc., and to control and manage the main battery pack 210 and the entire battery based on the measured information. In particular, the battery management system 250 serves to control the charge/discharge control switch 220 so as to prevent overcharge and overdischarge and prevent the flow of overcurrent based on the status of the main battery pack 210. Moreover, the battery management system 250 serves to transmit the status information of the main battery pack 210 and various information of the entire battery to a vehicle computing system 350 mounted in the vehicle.

The emergency charging module 110 is provided with an external charging terminal connected to the main battery pack 210 to receive charging power directly from the outside in the event of an emergency, thereby charging the main battery pack 210. The emergency charging module 110 is provided with the external charging terminal which can be used in an emergency, separately from the main charging terminal 230. That is, while the main charging terminal 230 is connected to a terminal of a predetermined standard provided in a battery charging station to perform charging, the external charging terminal provided in the emergency charging module 110 is designed to temporarily charge the battery in an emergency.

In more detail, the emergency charging module 110 includes the external charging terminal connected to the main battery pack, a first voltage measurement unit for measuring the voltage of the external charging terminal, and an emergency charging switch for switching the connection between the external charging terminal and the main battery pack. The first voltage measurement unit serves to measure the voltage of the external charging terminal and to transmit the measured voltage value to the emergency control module 150, which will be described later, thereby determining whether emergency charging is performed through the external charging terminal.

Moreover, the emergency charging switch serves to switch an electrical connection between the external charging terminal and the main battery pack 210. The emergency charging switch is turned on and off by the control of the emergency control module 150, which will be described later. That is, in a normal state, the emergency charging switch cuts off the electrical connection between the external charging terminal of the emergency charging module 110 and the main battery pack 210 and, when the emergency charging is performed through the external charging terminal, electrically connects a line to the main battery pack 210 under the control of the emergency control module 150, which will be described later.

The auxiliary battery connection module 120 is provided with an auxiliary battery connection terminal connected to a contactor of the main power line L connected from the main battery pack 210 to the vehicle power input terminal to connect to an auxiliary battery in an emergency, thereby directly supplying power to the vehicle. The auxiliary battery connection module 120 includes the auxiliary battery connection terminal, a second voltage measurement unit, and an auxiliary battery switch. The auxiliary battery connection terminal is connected to the contactor of the main power line L and includes a connector electrically connected to a power output terminal of the auxiliary battery mounted externally. Like the first voltage measurement unit, the second voltage measurement unit serves to measure the voltage of the auxiliary battery connection terminal and to transmit the measured voltage value to the emergency control module 150, which will be described later, thereby determining whether the power from the auxiliary battery is supplied through the auxiliary battery connection terminal.

Moreover, the auxiliary battery switch serves to switch an electrical connection between the auxiliary battery connection terminal and the main power line L. The auxiliary battery switch is turned on and off by the control of the emergency control module 150, which will be described later. That is, in a normal state, the auxiliary battery switch cuts off the electrical connection between the auxiliary battery connection terminal of the auxiliary battery connection module 120 and the contactor and, when the power from the auxiliary battery is supplied through the auxiliary battery connection module 120, electrically connects a line to the contactor under the control of the emergency control module 150, which will now be described below.

The emergency control module 150 may be included in the battery management system 250 and serves to control the emergency charging module 110 and the auxiliary battery connection module 120, thereby controlling the battery in an emergency. The emergency control module 150 determines whether the voltage is detected from the emergency charging module 110 and the auxiliary battery connection module 120, thereby automatically detecting whether the emergency charging is performed by the emergency charging module 110 or whether the auxiliary battery is mounted to supply power.

When an emergency unit from the outside is detected in the above manner, the battery pack switches to an emergency mode. First, when the voltage is detected by the first voltage measurement unit of the emergency charging module 110, the emergency control module 150 determines that the emergency charging power is applied through the external charging terminal, then switches to an emergency charging mode, and turns on the emergency charging switch of the emergency charging module 110 to supply power to the main battery pack 210, thereby performing the charging operation. Moreover, the emergency control module 150 turns off the charge/discharge control switch 220 such that the power is not supplied to the vehicle during the charging operation.

Furthermore, when the main battery pack is being charged in the emergency charging mode, the emergency control module 150 measures the voltage of the main battery pack and maintains the charging operation until the charging voltage reaches a predetermined reference value. If the charging voltage reaches the predetermined reference value, the emergency control module 150 turns off the emergency charging switch of the emergency charging module 110 to cut off the power of the external charging terminal, thereby stopping the emergency charging operation.

When the voltage is detected by the second voltage measurement unit of the auxiliary battery connection module 120, the emergency control module 150 determines that the auxiliary power is supplied from the auxiliary battery to the vehicle through the auxiliary battery connection terminal, then switches to an auxiliary battery connection mode, and turns on the auxiliary battery switch of the auxiliary battery connection module 120, thereby supplying power to the vehicle through the main power line L. Moreover, the emergency control module 150 turns off the charge/discharge control switch 220 such that the auxiliary power is not supplied to the main battery pack 210 while the auxiliary power is being supplied to vehicle.

When the power is being supplied from the auxiliary battery to the vehicle in the auxiliary battery connection mode, the emergency control module 150 measures the voltage of the auxiliary battery connected by the auxiliary battery connection module 120, calculates a state-of-charge (SOC) of the auxiliary battery based on the measured voltage value, and transmits the calculated SOC to the vehicle computing system 350.

Moreover, when switching to the emergency charging mode or the auxiliary battery connection mode, the emergency control module 150 transmits mode switching information to the vehicle computing system 350 such that a user of the vehicle can identify the mode in which the battery pack of the vehicle is operating.

Although not shown in the figures, the pack housing is an external housing for accommodating an assembly of the main battery pack 210, the charge/discharge control switch 220, the main charging terminal 230, the battery management system 250, the emergency charging module 110, the auxiliary battery connection module 120, and the emergency control module 150.

Figure 2:
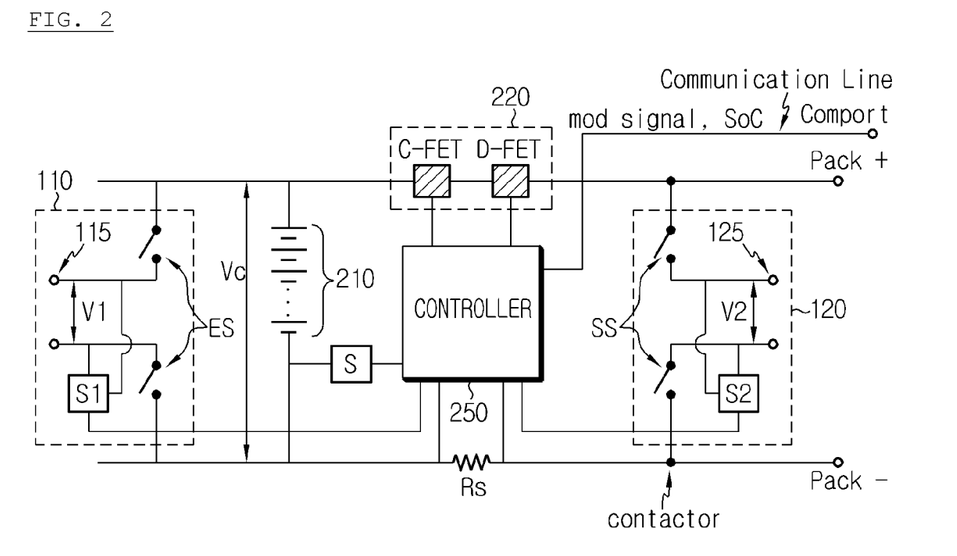
FIG. 2 is a circuit diagram showing the main circuit configuration of a battery pack with a control function in accordance with a preferred embodiment of the present disclosure.

FIG. 2 is a circuit diagram showing the main circuit configuration of a battery pack with a control function in accordance with a preferred embodiment of the present disclosure.

The circuit operation of the battery pack with a control function and that of the battery control apparatus in accordance with a preferred embodiment of the present disclosure will be described in detail with reference to FIG. 2.

Referring to FIG. 2, in the internal circuit of the battery pack according to the present disclosure, a high potential line Pack + and a low potential line Pack − are disposed at both ends of the main battery pack 210, respectively. The high potential line and the low potential line are connected to the vehicle power input terminal disposed, respectively. Moreover, the charge/discharge control switch 220 including the C_FET transistor and the D_FET transistor is disposed on the high potential line or the low potential line and connected to the battery management system 250 (hereinafter referred to as a controller) including the emergency control module 150 to be turned on and off.

Further, the emergency charging module 110 is connected to both ends of the high potential line and the low potential line around the main battery pack 210. The emergency charging module 110 is provided with an external charging terminal 115, and an emergency charging switch ES is provided on a connection portion of the high potential line and a connection portion of the low potential line, respectively.

The auxiliary battery connection module 120 is electrically connected to the contactor disposed between the charge/discharge control switch 220 and the vehicle power input terminal 310 on the high potential line and the low potential line. The auxiliary battery connection module 120 is provided with an auxiliary battery connection terminal 125, and an auxiliary battery switch SS is provided on a connection portion of the high potential line and a connection portion of the low potential line, respectively.

The main battery pack 210, the emergency charging module 110, and the auxiliary battery connection module 120 include a main battery pack voltage measurement unit S, a first voltage measurement unit S1, a second voltage measurement unit S2, respectively, which are connected to the controller 250 to measure voltage Vc of the main battery pack, voltage V1 of the external charging terminal, and voltage V2 of the auxiliary battery connection terminal.

The controller 250 is connected to a communication port (COM port) of the vehicle computing system to transmit various signals and information data to the vehicle.

The circuit operation during which the emergency control is performed by the controller 250 in the configured circuit will be described below.

First, a case where the emergency charging operation is performed by the emergency charging module 110 will be described below. External charging power is connected to the external charging terminal 115, and the first voltage measurement unit S1 measures the voltage applied to the external charging terminal 115 and transmits the measured voltage value to the controller 250. The controller 250 determines based on the measured voltage value that the emergency charging operation is being performed, switches to the emergency charging mode, turns on the emergency charging switch ES, and turns off the charge/discharge control switch 220.

Then, the charging power supplied through the external charging terminal 115 is applied to the main battery pack 210 through the emergency charging switch ES, thereby charging the main battery pack 210. The power supply to the vehicle power input terminal is cut off by the closing of the charge/discharge control switch 220. Moreover, the controller 250 measures the power of the main battery pack 210 through the main battery pack power measurement unit S. If the power reaches a predetermined reference value, the controller 250 determines that the emergency charging operation is completed and turns off the emergency charging switch, thereby stopping the emergency charging operation. Upon completion of the emergency charging operation, the controller 250 turns on the charge/discharge control switch 220 to supply the power of the main battery pack 210 to the vehicle power input terminal.

Next, a case where the power from the auxiliary battery is supplied through the auxiliary battery connection module 120 will be described below. In this case, the external auxiliary battery is electrically connected to the auxiliary battery connection terminal 125, and the second voltage measurement unit S2 measures the voltage applied to the auxiliary battery connection terminal 125 and transmits the measured voltage value to the controller 250. The controller 250 determines based on the measured voltage value that the power from the auxiliary battery is being supplied, switches to the auxiliary battery connection mode, turns on the auxiliary battery switch SS, and turns off the charge/discharge control switch 220.

By the control process, the high potential line and the low potential line connected to the main battery pack 210 are cut off by the opening of the charge/discharge control switch 220, and the auxiliary battery connection terminal 125 and the contactor of the high potential line Pack + and the low potential line Pack − are connected together by the closing of the auxiliary battery switch SS. Therefore, the auxiliary battery connection terminal 125 is being electrically connected to the vehicle power input terminal 310 and disconnected to the main battery pack 210. In this case, the power of the auxiliary battery applied from the auxiliary battery connection terminal 125 is supplied only to the vehicle power input terminal 310, not to the main battery pack 210.

At the same time when the power is supplied to the vehicle according to the auxiliary battery connection mode, the controller 250 measures the voltage of the auxiliary battery through the second voltage measurement unit S2 and calculates the state-of-charge of the auxiliary battery. As such, in the auxiliary battery connection mode, the controller 250 calculates the state-of-charge of the auxiliary battery and transmits the measured value to the vehicle computing system through a communication line.

Here, the method of calculating the state-of-charge of the battery uses a function having three variables such as voltage, temperature, and resistance of the battery. This method of calculating the state-of-charge of the battery is known in the art, and thus a detailed description thereof will be omitted.

However, in the case where the auxiliary battery is connected, only the voltage of the auxiliary battery measured by the second voltage measurement unit S2 provided in the auxiliary battery connection module 120 can be used, and thus the commonly know method cannot be used to calculate the state-of-charge of the auxiliary battery. Therefore, in the present disclosure, the state-of-charge of the auxiliary battery is calculated only based on the measured voltage value of the auxiliary battery. Here, the voltage is set to 100% when the auxiliary battery is fully charged and thus can be used for the vehicle, and the voltage is set to 0% when the auxiliary battery is fully discharged and thus cannot be used for the vehicle such that the measured voltage value of the auxiliary battery is converted into a percentage based on the ratio, thereby calculating the state-of charge of the auxiliary battery.

Alternatively, in the case where an SOC calculation module is mounted in the auxiliary battery itself, the controller 250 may receive calculated SOC information from the auxiliary battery and transmit the SOC information to the vehicle computing system.

Moreover, when transmitting various information to the vehicle computing system, the controller 250 may use a vehicle communication protocol such as CAN communication. Moreover, the information transmitted from the controller 250 through the communication port of the vehicle computing system may further include emergency mode switching status information. That is, mode status information, which indicates whether the current mode is the emergency charging mode or the auxiliary battery connection mode, may be transmitted to the user of the vehicle to identify the corresponding status.

The controller 250 performing the above-described operations may be configured as a microprocessor capable of executing a code obtained by programming the battery control method according to the present disclosure or as a semiconductor chip obtained by implementing the control flow of the battery control method according to the present disclosure as a logic circuit, but the present disclosure is not limited thereto.

Meanwhile, the above-described battery control method according to the present disclosure may be used in combination with the battery management system 250 for managing the battery pack.

Moreover, the present disclosure may be used in combination with various power systems such as fossil fuel vehicles, electric vehicles, hybrid vehicles, electric bicycles, etc.

Further, it will be apparent to those having ordinary skill in the art that the battery control method according to the present disclosure may be modularized into a PCB circuit or an application-specific integrated circuit (ASIC) and mounted in the battery pack.

Figure 3:
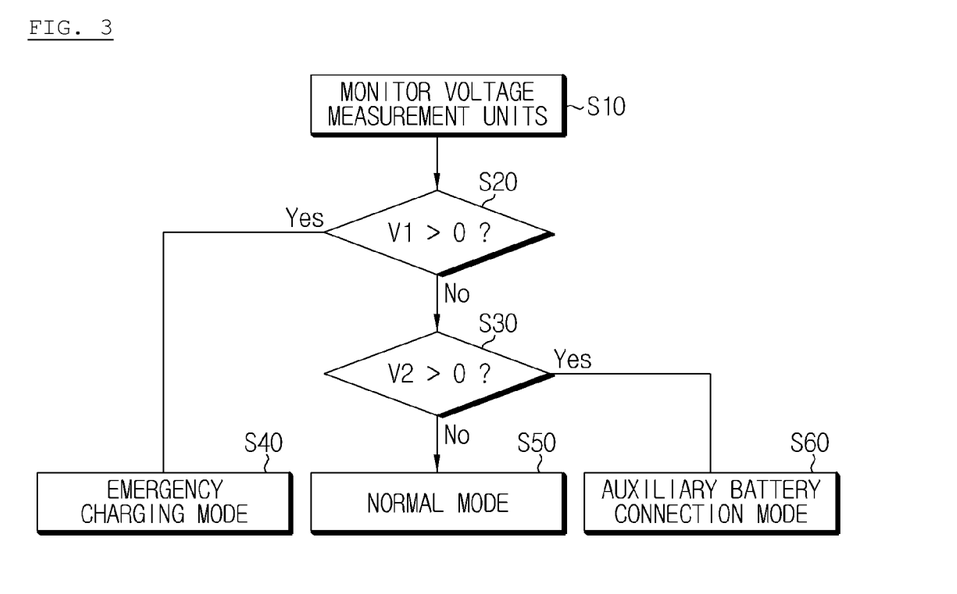
FIG. 3 is a flowchart showing the process of a battery control method in accordance with a preferred embodiment of the present disclosure.

FIG. 3 is a flowchart showing the process of a battery control method in accordance with a preferred embodiment of the present disclosure.

Referring to FIG. 3, according to the battery control method of the present disclosure, a process of checking voltage measurement units provided in various emergency handling unit is performed. That is, the process is a monitoring process to monitor measured values received from voltage measurement units provided in an emergency charging unit, an auxiliary battery connection unit, etc. (S10)

Next, during the monitoring of the voltage measurement units, a process of determining whether the value of V1, which is the voltage measured by the first voltage measurement unit S1 provided in the emergency charging unit, is above 0 V is performed. That is, when a voltage above 0 V is applied to the external charging terminal of the emergency charging unit, the emergency charging unit is being electrically connected to the external charging terminal from the outside. On the contrary, when a voltage of 0 V is applied to the external charging terminal of the emergency charging unit, no electrical connection is being made from the outside (S20).

Therefore, when a voltage above 0 V is measured by the first voltage measurement unit, it is determined that the emergency charging is being provided from the outside, and the controller switches to the emergency charging mode for performing the emergency charging operation on the battery pack. When switching to the emergency charging mode, the controller applies power from the emergency charging unit to the main battery pack to perform the charging operation and cuts off the main power line through which power is supplied from the main battery pack to the vehicle (S40).

On the contrary, when a voltage of 0 V is measured by the first voltage measurement unit, it is determined that the emergency charging is not being provided from the outside, and a process of determining whether the value of V2, which is the voltage measured by the second voltage measurement unit S2 provided in the auxiliary battery connection unit, is above 0 V is performed. That is, when a voltage above 0 V is applied to the auxiliary battery connection terminal of the auxiliary battery connection unit, the auxiliary battery is being mounted externally to apply power to the auxiliary battery connection terminal. However, when a voltage of 0 V is applied to the auxiliary battery connection terminal of the auxiliary battery connection unit, the auxiliary battery is not being connected externally (S30).

In the above step, when a voltage above 0 V is measured by the second voltage measurement unit S2, it is determined that the auxiliary battery is being mounted externally, and the controller switches to the auxiliary battery connection mode in which the power of the auxiliary battery is supplied to the vehicle to operate in an emergency. When switching to the auxiliary battery connection mode, the controller applies power from the auxiliary battery to the main power line connected to the vehicle to supply emergency power to the vehicle and cuts off the main battery line to prevent the power from being applied to the main battery pack (S60).

Moreover, when the voltage measured in the above steps S20 and S30 is all 0 V, it is determined that no connection is being made to the emergency charging unit and the auxiliary battery connection unit, and the controller maintains a normal mode. That is, the power is supplied from the main battery pack to the vehicle (S50).

Figure 4:
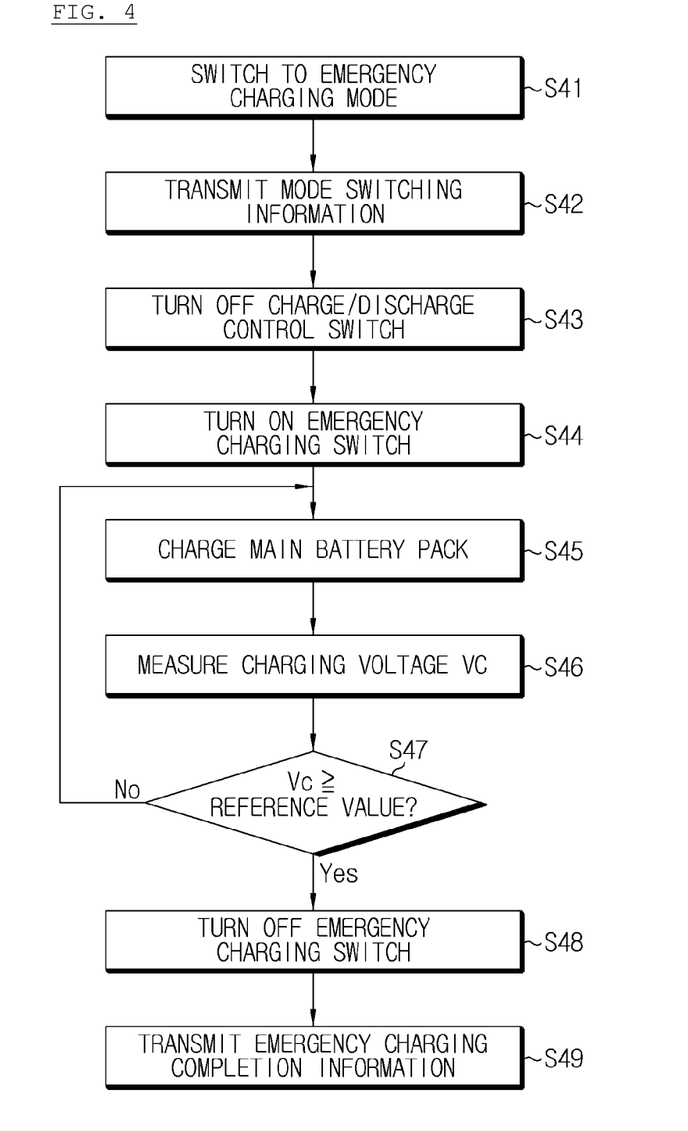
FIG. 4 is a flowchart showing a control process performed in a battery pack in an emergency charging mode of a battery control method in accordance with a preferred embodiment of the present disclosure.

FIG. 4 is a flowchart showing a control process performed in a battery pack in an emergency charging mode of a battery control method in accordance with a preferred embodiment of the present disclosure.

Referring to FIG. 4, when a voltage above 0 V is measured by the emergency charging module, the controller switches to the emergency charging mode (S41).

When switching to the emergency charging mode, the controller transmits information indicating the mode switching to the vehicle computing system. At this time, the controller transmits emergency charging mode switching information to the vehicle computing system through the communication port of the vehicle based on the vehicle communication protocol. Thus, a user of the vehicle can receive a notification indicating the emergency charging mode displayed on the vehicle computing system and thus can recognize that the emergency charging operation is performed (S42).

Next, the controller turns off the charge/discharge control switch provided between the main battery pack and vehicle power input terminal. Thus, the emergency charging power is not applied to the vehicle power input terminal during the emergency charging operation (S43).

Moreover, the controller turns on the emergency charging switch provided between the main battery pack and the external charging terminal of the emergency charging module. Thus, the charging power supplied from the external charging unit can be transmitted to the main battery pack (S44).

As such, when the charging power is applied from the external charging unit to the main battery pack, the main battery pack is charged (S45).

The controller measures a charging voltage Vc through the voltage measurement unit S provided in the main battery pack during the charging operation of the main battery pack (S46).

At this time, the controller determines whether the charging voltage Vc reaches or exceeds a predetermined reference value. Here, if the charging voltage Vc does not reach the predetermined reference value, the controller maintains the charging operation of step S45 (S47).

On the contrary, if the charging voltage Vc reaches or exceeds the predetermined reference value, the controller determines that the main battery pack is fully charged and turns off the emergency charging switch provided in the emergency charging module such that the charging power supply from the external charging unit is cut off (S48).

Moreover, the controller transmits emergency charging completion information to the vehicle computing system. Thus, the emergency charging completion information is displayed on the vehicle, and thus the user can recognize the completion of the emergency charging. Here, the vehicle computing system can display the emergency charging completion to the user by voice or message (S49).

Figure 5:
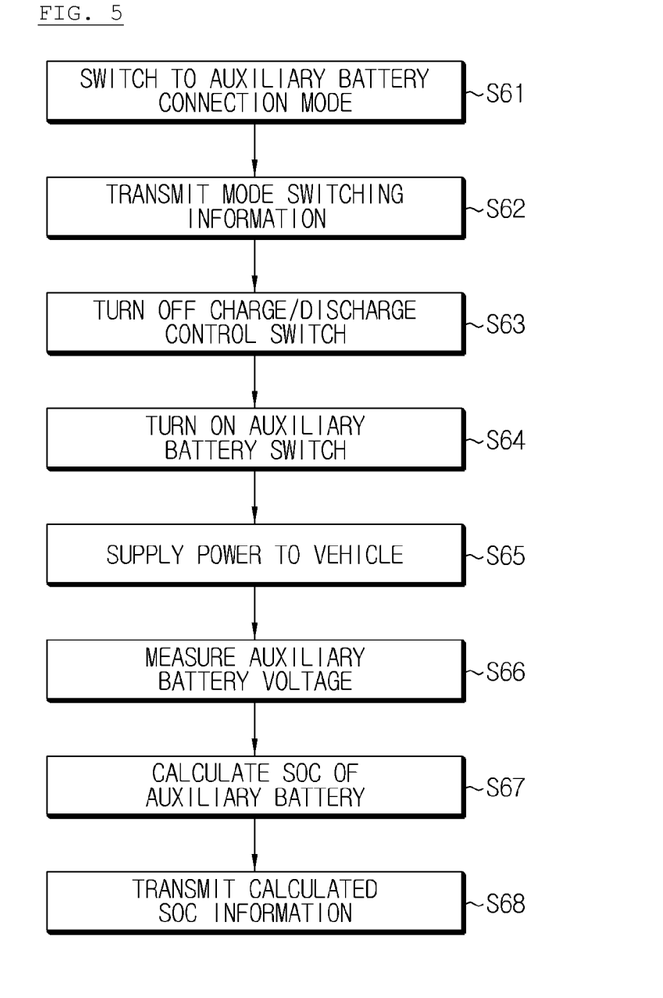
FIG. 5 is a flowchart showing a control process performed in a battery pack in an auxiliary battery connection mode of a battery control method in accordance with a preferred embodiment of the present disclosure.

FIG. 5 is a flowchart showing a control process performed in a battery pack in an auxiliary battery connection mode of a battery control method in accordance with a preferred embodiment of the present disclosure.

A control process performed by the battery management system in an auxiliary battery connection mode will be described with reference to FIG. 5.

First, when the second voltage measurement unit provided in the auxiliary battery connection unit measures a voltage above 0 V applied to the auxiliary battery connection terminal, the controller determines that the auxiliary battery is being connected externally and switches to the auxiliary battery connection mode (S61).

When switching to the auxiliary battery connection mode, the controller transmits information indicating the mode switching to the vehicle computing system. At this time, the controller transmits auxiliary battery connection mode switching information to the vehicle computing system through the communication port of the vehicle based on the vehicle communication protocol. Thus, the user of the vehicle can receive a notification indicating the auxiliary battery connection mode displayed on the vehicle computing system and thus can recognize that the power of the auxiliary battery is supplied to the vehicle (S62).

Next, the controller turns off the charge/discharge control switch provided between the main battery line and the main battery pack. Thus, the power of the auxiliary battery is not applied to the main battery pack during the power supply from the auxiliary battery (S63).

Moreover, the controller turns on the auxiliary battery switch provided between the main battery line connected to the vehicle power input terminal and the auxiliary battery connection terminal of the auxiliary battery module. As such, when the auxiliary switch is turned on, the auxiliary power supplied from the auxiliary battery is applied to the main power line through the contactor and then applied to the vehicle power input terminal connected to the main power line. At this time, since the connection line from the main power line to the main battery pack is cut off in the above step S63, the power supplied from the auxiliary battery is applied only to the vehicle, not to the main battery pack (S64).

As such, when the auxiliary power is applied from the auxiliary battery to the vehicle power input terminal, the auxiliary power is supplied to a vehicle driving device and devices that require power, not to the main battery pack, thereby driving the vehicle and operating the devices (S65).

Thereafter, the controller measures the voltage V2 of the auxiliary battery through the second voltage measurement unit S2 provided in the auxiliary battery connection unit when the auxiliary power is being supplied to the vehicle (S66).

When the voltage of the auxiliary battery is measured, the controller calculates the current state-of-charge of the auxiliary battery based on the measured voltage (S67). The configuration of calculating the state-of-charge of the auxiliary battery based on the measured voltage has been described above, and thus a repeated description thereof will be omitted.

When the state-of-charge of the auxiliary battery is calculated, the controller transmits the calculated SOC information to the vehicle computing system. Thus, the user of the vehicle can receive the SOC information of the auxiliary battery and determine how long the vehicle will be able to travel with the auxiliary power supplied from the auxiliary battery (S68).

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery control apparatus provided in a vehicle battery pack for controlling the battery pack, which can be charged in an emergency, the battery control apparatus comprising:
    an emergency charging unit including an external charging terminal to which an external charging power is connected from outside, thereby directly applying power to a main battery pack from the outside, a first voltage measurement unit configured to measure the voltage of the external charging terminal, and an emergency charging switch configured to switch the connection between the external charging terminal and the main battery pack; and
    an emergency control unit configured to switch to an emergency charging mode by turning on the emergency charging switch based on the voltage measurement of the first voltage measurement unit.

2. The battery control apparatus of claim 1, wherein the emergency control unit turns off a charge/discharge control switch connected to the main battery pack when switching to the emergency charging mode.

3. The battery control apparatus of claim 1, wherein the emergency control unit detects the voltage of the main battery pack in the emergency charging mode and turns off the emergency charging switch, if the charging voltage reaches a predetermined reference value.

4. The battery control apparatus of claim 3, wherein when the emergency charging switch is turned off, the emergency control unit transmits a notification signal indicating the completion of the emergency charging to a vehicle computing system.

5. The battery control apparatus of claim 1, wherein when switching to the emergency charging mode, the emergency control unit transmits mode switching information to a vehicle computing system.

6. A battery control apparatus provided in a vehicle battery pack for controlling the battery pack, which can be equipped with an auxiliary battery, the battery control apparatus comprising:
   an auxiliary battery connection unit including an auxiliary battery connection terminal to which an auxiliary battery is mounted externally from outside, thereby directly applying power to a vehicle power input terminal through a contactor, a second voltage measurement unit for measuring the voltage of the auxiliary battery connection terminal, and an auxiliary battery switch for switching the connection between the auxiliary battery connection terminal and the contactor; and
   an emergency control unit configured to switch to an auxiliary connection mode by turning on the auxiliary battery switch based on the voltage measurement of the second voltage measurement unit.

7. The battery control apparatus of claim 6, wherein the emergency control unit turns off a charge/discharge control switch connected to the main battery pack when switching to the auxiliary connection mode.

8. The battery control apparatus of claim 6, wherein when switching to the auxiliary connection mode, the emergency control unit measures the voltage of the auxiliary battery through the second voltage measurement unit, calculates state-of-charge information of the auxiliary battery, and transmits the information to a vehicle computing system.

9. The battery control apparatus of claim 6, wherein when switching to the auxiliary connection mode, the emergency control unit receives state-of-charge information from the auxiliary battery and transmits the information to a vehicle computing system.

10. The battery control apparatus of claim 6, wherein when switching to the auxiliary connection mode, the emergency control unit transmits mode switching information to a vehicle computing system.

11. A battery control method controlling a battery in an emergency and implemented in a battery control apparatus provided in a vehicle battery pack, which can be charged in an emergency, the battery control method comprising the steps of:
   (a) connecting an external charging power to an external charging terminal from outside, wherein the external charging terminal is electrically connected to or disconnected from the main battery pack through an emergency charging switch;
   (b) detecting whether or not a voltage is applied to the external charging terminal; and
   (c) switching to an emergency charging mode, when detecting the voltage is applied to the external charging terminal, turning on the emergency charging switch and charging the main battery pack with the external charging power supplied through the external charging terminal.

12. The battery control method of claim 11, wherein in step (c), mode switching information is transmitted to a vehicle computing system when switching to the emergency charging mode.

13. The battery control method of claim 11, wherein step (c) comprises the steps of:
   (1) turning off a charge/discharge control switch connected to the main battery pack;
   (2) turning on the emergency charging switch connected to the external charging terminal and supplying the external charging power to the main battery pack;
   (3) measuring the charging voltage of the main battery pack and maintaining the charging operation until the charging voltage reaches a predetermined reference value; and
   (4) turning off the emergency charging switch, if the charging voltage of the main battery pack reaches the predetermined reference value, and completing the emergency charging.

14. The battery control method of claim 13, wherein after step (4), emergency charging completion information is transmitted to a vehicle computing system.

15. A battery control method controlling a battery in an emergency and implemented in a battery control apparatus provided in a vehicle battery pack, which can be equipped with an auxiliary battery, the battery control method comprising the steps of:
   (a) externally mounting the auxiliary battery to an auxiliary battery connection terminal from outside, wherein the auxiliary battery connection terminal is electrically connected to a vehicle power input terminal through a contactor by using an auxiliary battery switch;
   (b) detecting whether a voltage is applied to an auxiliary battery connection terminal; and
   (c) switching to an auxiliary connection mode, when detecting the voltage is applied to the auxiliary battery connection terminal, and supplying power from the auxiliary battery to the vehicle power input terminal through the contactor.

16. The battery control method of claim 15, wherein in step (c), mode switching information is transmitted to a vehicle computing system when switching to the auxiliary connection mode.

17. The battery control method of claim 15, wherein step (c) comprises the steps of:
   (5) turning off the charge/discharge control switch connected to the main battery pack; and
   (6) turning on the auxiliary battery switch connected to the auxiliary battery connection terminal and supplying the power from the auxiliary battery to the vehicle power input terminal through the contactor.

18. The battery control method of claim 17, further comprising, after step (6), the steps of:
   (7) measuring the voltage of the auxiliary battery and calculating a state-of-charge of the auxiliary battery; and
   (8) transmitting the calculated state-of-charge of the auxiliary battery to a vehicle computing system.

19. The battery control method of claim 17, further comprising, after step (6), the steps of:
   (9) receiving state-of-charge information from the auxiliary battery; and
   (10) transmitting the received state-of-charge information of the auxiliary battery to a vehicle computing system.

* * * * *